(12) United States Patent
Chance et al.

(10) Patent No.: US 9,317,059 B2
(45) Date of Patent: Apr. 19, 2016

(54) SYSTEMS AND METHODS FOR TRACKING ELAPSED TIME (71) Applicant: Intel IP Corporation, Santa Clara, CA (US)

(72) Inventors: Greg Chance, Oberhaching (DE); Christian Kranz, Ratingen (DE); Markus Hammes, Dinslaken (DE); Junlin Yan, Dusseldorf (DE)

(73) Assignee: Intel IP Corporation, Santa Clara, CA (US)

( * ) Notice: Subject to any disclaimer, the term of this patent is extended or adjusted under 35 U.S.C. 154(b) by 219 days.

(21) Appl. No.: 14/084,946

(22) Filed: Nov. 20, 2013

(65) Prior Publication Data

US 2015/0143156 A1    May 21, 2015

(51) Int. Cl.
*G06F 1/04* (2006.01)
*G06F 1/14* (2006.01)
*G06F 1/30* (2006.01)
*G06F 17/30* (2006.01)
*G06F 1/32* (2006.01)

(52) U.S. Cl.
CPC .. *G06F 1/14* (2013.01); *G06F 1/30* (2013.01); *G06F 1/3206* (2013.01); *G06F 17/30044* (2013.01); *G06F 17/30578* (2013.01); *G06F 17/30749* (2013.01)

(58) Field of Classification Search
CPC ................ G06F 1/14; G06F 17/30044; G06F 17/30578; G06F 17/30749
USPC .......................................... 713/500, 502, 503
See application file for complete search history.

(56) References Cited

U.S. PATENT DOCUMENTS

| | | | |
|---|---|---|---|
| 6,304,517 B1 * | 10/2001 | Ledfelt | G06G 3/022 331/177 R |
| 6,392,961 B1 | 5/2002 | Chiam et al. | |
| 7,118,269 B2 | 10/2006 | Bening | |
| 7,973,607 B1 * | 7/2011 | Ciaffi | G06F 21/725 331/16 |

* cited by examiner

*Primary Examiner* — Michael J Brown
(74) *Attorney, Agent, or Firm* — Eschweiler & Associates, LLC (57) ABSTRACT

A system utilizing time tracking is disclosed. The system includes a real time clock, a time component, and a controller. The real time clock is configured to track time. The time component is configured to measure a time value without an additional power source. The controller is configured to determine an elapsed time using the time value and calibration information and to update the real time clock using the elapsed time in a restart mode.

20 Claims, 6 Drawing Sheets

SYSTEMS AND METHODS FOR TRACKING ELAPSED TIME

BACKGROUND

Devices of today are often time based and perform tasks, respond to events, perform maintenance, take measurements, generate log entries and the like based on time. To perform these tasks, the device needs to incorporate some type of persistent clock, generally referred to as a real time clock. The real time clock is responsible to provide time information within an acceptable accuracy range.

The real time clock includes an oscillator and is typically powered by a main source of power. For example, in a personal computer, the real time clock is powered by power supply that converts AC power to a suitable power level. However, if the main source of power becomes inoperable, the oscillator may stop working and the real time clock can lose its clock information. As a result, the device operation can degrade and/or fail.

One technique to account for loss of the main source of power is to provide a backup battery. This battery is configured to supply power to the real time clock in the event that the main source of power is off. The battery permits operation of the oscillator until the main source of power is turned back ON.

However, including a battery can be expensive and difficult to include in a device.

DETAILED DESCRIPTION

The present invention will now be described with reference to the attached drawing figures, wherein like reference numerals are used to refer to like elements throughout, and wherein the illustrated structures and devices are not necessarily drawn to scale.

Systems and methods are disclosed that facilitate time keeping with a main source of power being unavailable. The systems and methods include utilizing a non-oscillator technique of tracking or determining time without the main power so that when the main source resumes, the systems and the clock can operate properly. Instead of an oscillator, a real time clock (RTC) capacitor is used to determine elapsed time since the loss of power.

Figure 1:
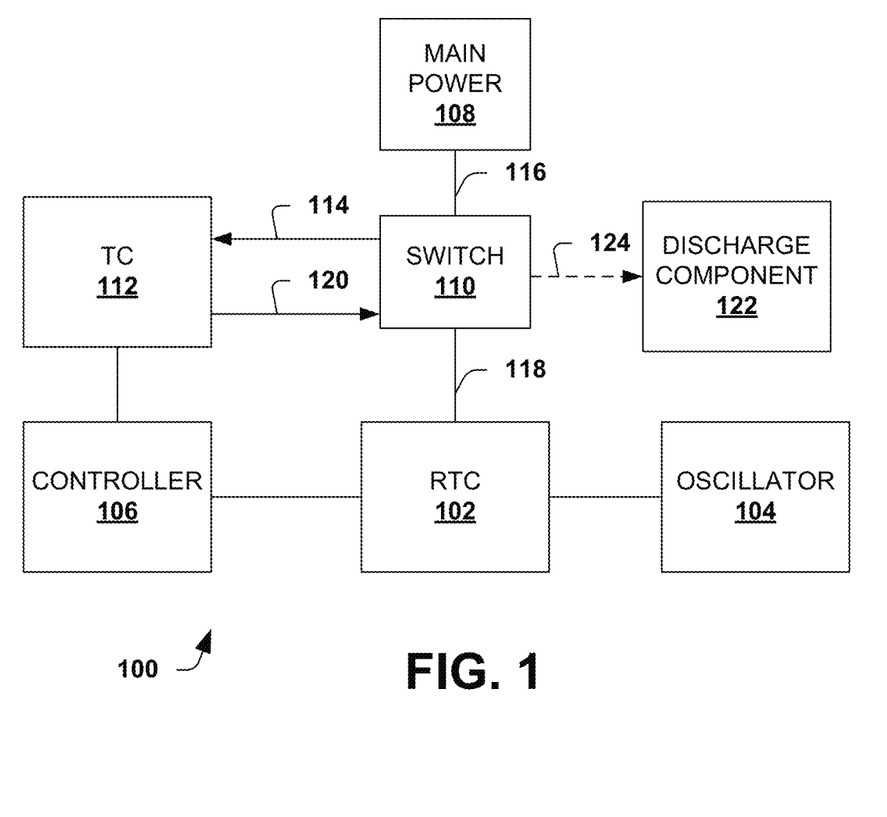
FIG. 1 is a block diagram illustrating a system utilizing a time component for time tracking.

FIG. 1 is a block diagram illustrating a system 100 utilizing a time component for time tracking. The system 100 tracks time with or without power by using the time component and determining elapsed time on a return to power.

The system 100 can be used in phone systems, mobile applications, and the like.

The system 100 includes a real time clock 102, an oscillator 104, a controller 106, a main power 108, a switch component 110, and a time component 112.

The real time clock 102 is a component that tracks and reports time with a selected or designed accuracy. The real time clock 102 tracks time using an acceptable format. In one example, the real time clock 102 tracks elapsed time from a starting point, time zero. In another example, the real time clock 102 tracks as coordinated universal time (UTC). The real time clock 102 uses a timing mechanism to perform the timing. In this example, an oscillator 104 provides a time varying signal at a suitable frequency. A common frequency used for clocks is 32.768 kHz, which provides $2^{15}$ cycles per second. However, other frequencies can be utilized.

In another example, a power line frequency is used (60 Hz) instead of the above. The use of power line frequency eliminates the need for the oscillator 104.

The real time clock 102 operates in several modes and receives power 118. In an ON or normal mode, the RTC 102 tracks time and reports time on request. The RTC 102 includes one or more counters for tracking time and uses a clock signal. In the ON mode, the power 118 is supplied by the main power 108 via the switch 110. In an OFF mode, the RTC 102 does not track time and is essentially OFF. In the Off mode, RTC counters are off and the received clock signal is stopped or ignored. The RTC 102 acts as a resistor or current drain to discharge power from the time component 112. The power 118 is drained from the time component 112 to the RTC 102.

It is appreciated that a variation is contemplated where a discharge component 122, such as a dedicated resistor, is used to selectively discharge power 124 from the time component 112 instead of the RTC 102. For example, a dedicated resistor with a relatively high resistance could be used in conjunction with a lower capacitance used with the time component 112. Additionally, the discharge component 122 could be utilized without calibration.

In a restart mode, the RTC 102 is turning on and may lack a current time. The main power 108 is available, however RTC counters are frozen or remain off and the received clock signal is stopped or ignored. In the restart mode, the RTC 102 receives an elapsed time or offset from the controller 106. The RTC 102 uses the elapsed time to update its time tracking before continuing with the ON mode. The restart mode, also referred to as an initialization mode, is a transition mode from the OFF mode to the ON mode.

In a calibrate mode, the RTC is turned 'off' and is used to calibrate and learn behavior of the time component 112. The controller 106 performs the calibration.

The main power 108 generates a main supply 116. The main power 108 includes non-battery sources, such as home AC power lines, and battery sources, such as a battery, capacitor, super-capacitor, and the like. The main power 108 is a relatively persistent power source and typically supplies power to other components and circuitry (not shown). The main power 108 provides power at a selected voltage and a selected current. However, at times, the provided power may be deemed insufficient or even absent. In one example, a battery has discharged to the point where its remaining capacity is insufficient to provide the selected power. At such times, the system 100 switches to the OFF mode and active operation is halted, but elapsed time is tracked using the time component 112.

The time component 112 is coupled to the switch 110 and tracks elapsed time when the system is in the OFF mode by tracking a time value. The time value starts at an initial value and trends lower the longer the system is in the OFF mode.

During the ON mode, the time component 112 is typically recharged or maintained charged using charge power 114 from the main power 108 via the switch 110. When the system 100 is in the OFF mode, the time component 112 discharges or drains current 120 through the RTC 102 via the switch 110, thus lowering the time value. The time component 112 can be configured to track a time value without an additional power, such as without the main power 108 during the OFF mode.

In one example, the time component 112 tracks time by lowering its voltage from an initial or charged value. Then, its current value at the time the main power 108 is back on is used to determine the elapsed time of the OFF mode. The current value is also referred to as the restart value.

The controller 106 controls operation of the RTC 102, the time component 112 and the switch 110. The controller 106 performed functions for the various system modes. In the ON mode, the controller 106 ensures that the switch 110 routes the main supply 116 as the receive power 118 for the RCT 102. Additionally, the controller 106 causes the charge power 114 to be provided to the time component 112 so as to cause the time component to charge to full value.

In the OFF mode, the controller 106 causes the time component 112 to drain power 120 through the RTC 102 via the switch 110. At this point, the main supply 116 is insufficient or absent.

In the restart mode, the controller 106 uses the switch component 110 to again provide the main supply 116 as the receive power for the RTC 102. Further, the controller 106 obtains the restart value from the time component 112 and determines an elapsed time. The controller 106 then provides the elapsed time to the RTC 102. Alternately, the controller 106 uses the elapsed time to determine a current time and provides the current time to the RTC. The controller 106 keeps the RTC 102 froze in the restart mode until the elapsed time has been provided and the ON mode can be resumed.

The controller 106 also operates in the calibration mode. Here, the controller 106 simulates an OFF mode and measures power drained and current values of the time component. The RTC 102 is turned off and the switch 110 is configured to drain power 120 from the time component 112. The current value of the time component 112 is stored with a reference to elapsed time. A more detailed example of performing calibration is described below.

Figure 2:
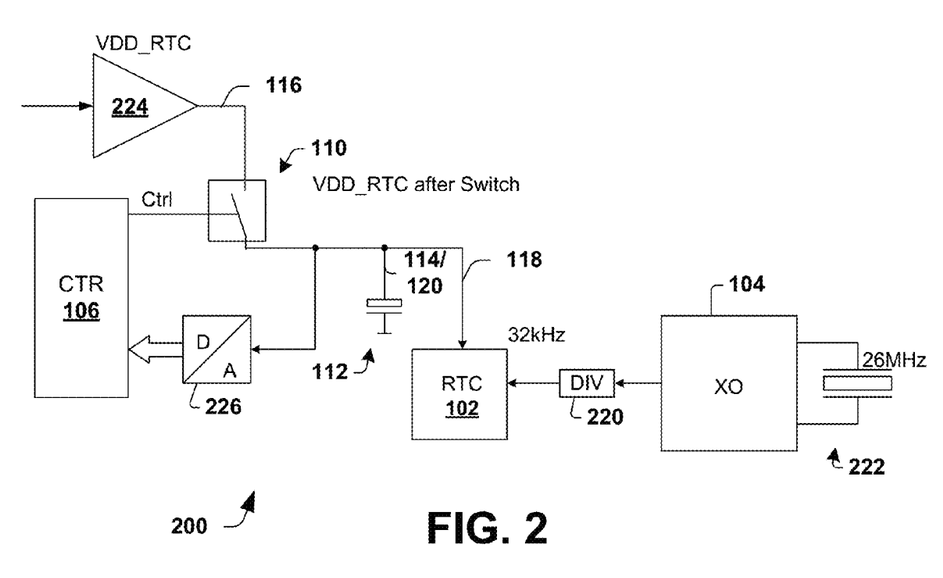
FIG. 2 is a diagram illustrating a system utilizing a capacitor as a time component for time tracking.

FIG. 2 is a diagram illustrating a system 200 utilizing a capacitor as a time component for time tracking. The system 200 tracks time without power by using the time component to determine an elapsed time on a return to power.

The system 200 is similar to the system 100 described above, however it is described with additional detail. Further, similarly numbered components can be referenced above for additional description.

The system 200 includes an oscillator 104, an RTC 102, a controller 106, and a switch component 110. These components operate substantially as described above. The oscillator 104 is shown coupled to a crystal 222 and a divider 220. The crystal 222 facilitates generation of an oscillating signal at a selected frequency by the oscillator 104. The divider 220 selectively divides or reduces the frequency of the oscillating signal, which is provided to the RTC 102. In one example, the crystal 222 is rated or selected to generate the oscillating signal at 26 MHz and the divider 220 selectively divides the signal to yield a 32 kHz oscillating signal.

A supply regulator 224 receives a power, such as a battery power and modifies or conditions the power and provides a main supply 116 at its output. The supply regulator 224 may perform voltage and/or current regulation. The main supply 116 is provided to the switch component 110.

The time component 112 in this example is a capacitor, also referred to as a time capacitor. The capacitor is coupled to the switch component 110 and the RTC 102. The capacitor is charged via a charge supply 114 when the system 200 is the ON mode and provides a drain current 120 when the system 200 is in the OFF mode. Thus, the time component 112 is self powered in that it does not require supplemental power, such as a backup battery or other backup power, during the OFF mode.

The capacitor remains connected to the RTC 102. When the system 200 is in the OFF mode, the main supply 116 is switched off by the switch component 110 and the charge present on the capacitor drains through the RTC. When the system 200 is in the ON mode, the main supply 116 is provided and the charge supply 114 flows into the capacitor.

The switch component 110, in this example, only connects or disconnects the main supply 116 to its output. The switch component 110 is controlled by the controller 106.

A measuring component 226 measures a voltage of the time component 112 during at least the OFF mode for the system 200. The measuring component 226, in one example, incorporates an analog to digital converter and provides the voltage measurement or value to the controller as a digital signal.

The controller 106 is coupled to the switch 110 and the measuring component 226. In the OFF mode, the controller 106 causes the switch 110 to disconnect the main supply 116. In a restart mode, the controller 106 obtains a restart value from the measuring component 226 and determines an elapsed time. In one example, the controller 106 uses a lookup table. In another example, the controller 106 use a previous calibration curve. In yet another example, the controller 106 uses a formula. An example of a suitable technique for determining an elapsed time is described below.

In a calibration mode, the controller 106 causes the switch 110 to disconnects the main supply 116 and tracks a voltage value of the time component 112 over a selected period of time. The measured values and time information are retained and utilized in the restart mode to determine the elapsed time.

Figure 3:
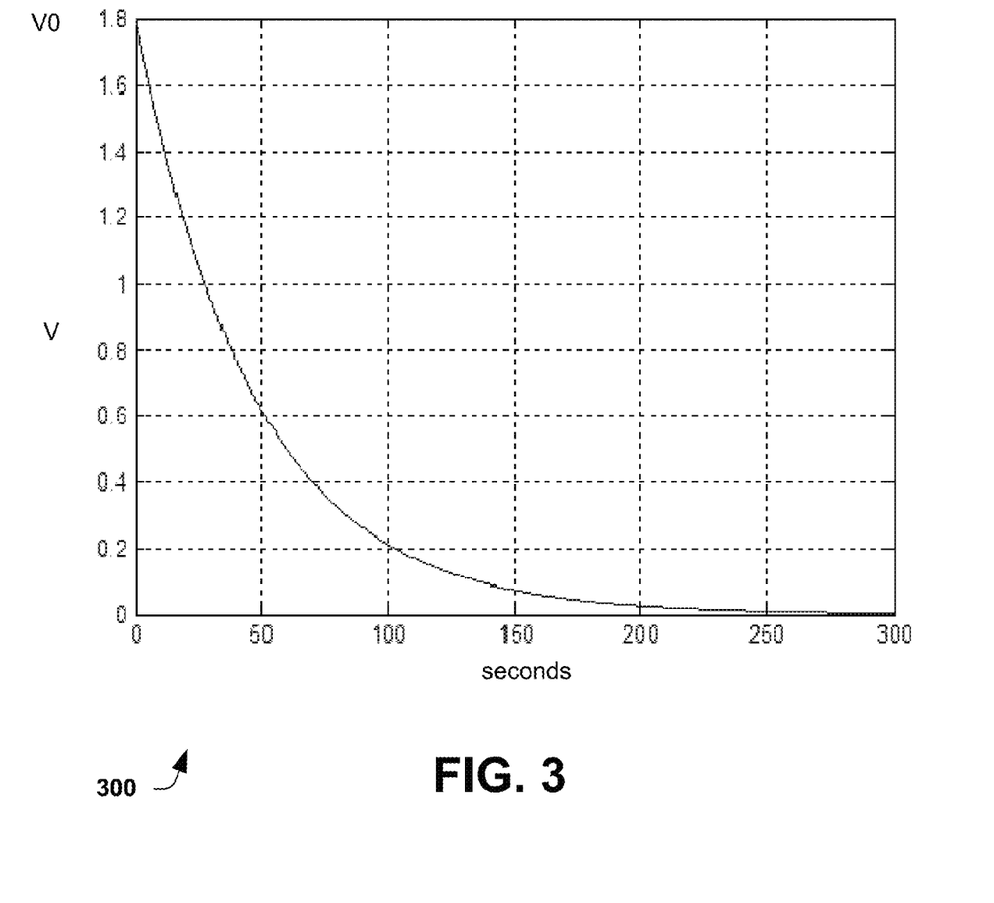
FIG. 3 is a graph illustrating a time component curve.

FIG. 3 is a graph illustrating a time component curve 300. The curve 300 is provided as an example to facilitate understanding. It is appreciated that the values shown are merely examples and are not intended to limit the disclosed systems and methods. The curve 300 can be generated using the systems described above, including suitable variations.

The graph is provided with an x-axis depicting time in seconds and a y-axis depicting a voltage of a time component. The time is the duration from turning of the main supply from the time component and indicates a drain through an RTC.

In this example, the time component is a capacitor or time capacitor and has a capacitance of 23 mF. The time component is at an initial value, V0, of about 1.8 V. The RTC, which drains current from the time component, has a resistance of about 2 k Ohm.

It is appreciated that the resistance of the RTC and, thus, the drain current generated by the time component vary according to characteristics including temperature, process, and the like. However, developing the time component curve 300 while the system is subjected to these characteristics can mitigate variations and provide a more accurate estimate of elapsed time.

The curve 300 can be developed by measuring the time component during the calibration process as its power is discharged via the RTC. The curve 300 is used to develop or derive a relationship that can later be used to estimate elapsed time when the system is in the OFF mode. In this example, the relationship can be estimated as:

$$t = t2 - t1 = R * C\left(\log\left(\frac{V(t1)}{V(t2)}\right)\right)$$

Where t represents elapsed time, t2 represents a reset time, t1 represents a start time or time zero, R is the resistance of the RTC, and C is the capacitance of the time component. The reset time is the time at which main power is restored to the system. The start time is the time at which main power was removed from the system. V(t1) represents the voltage at the time component at the start time. It is noted that the start time does not necessarily have to be the initial value, V0, described above. V(t2) represents the reset value or the voltage at the time component when main power is restored.

Figure 4:
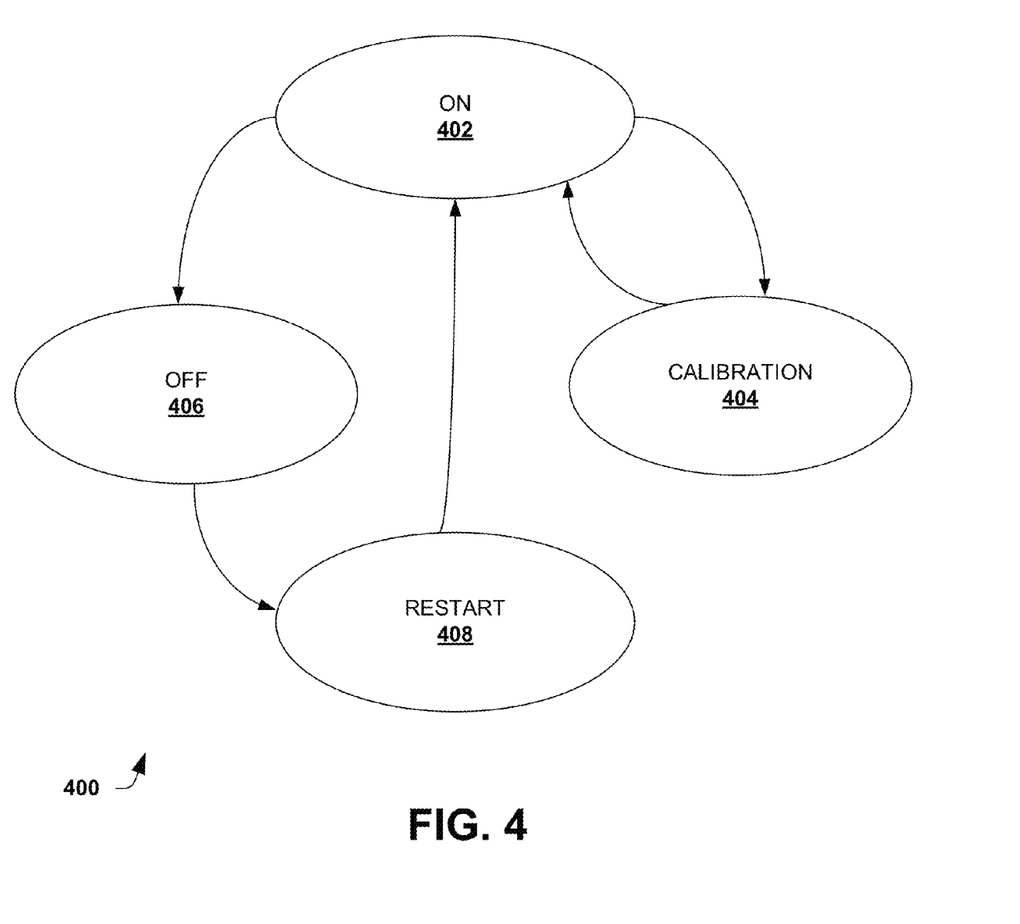
FIG. 4 is a state diagram illustrating various modes of operation for a system having a time tracking component.

FIG. 4 is a state diagram illustrating various modes 400 of operation for a system having a time tracking component. The modes 400 are somewhat simplified and examples of more detailed operations with the modes 400 are described below.

The modes 400 are utilized with a system, such as system 100 and system 200 described above.

The modes 400 include an ON mode 402, a calibration mode 404, an OFF mode 406, and a restart mode 408. In the ON mode, main power is present and charge power is provided to the time component, such as a capacitor. The main supply is used as the power source for the RTC, which tracks time.

The calibration mode 404 obtains calibration information, which can be used later to estimate elapsed time during the OFF mode. In the calibration mode, charge power to the time component is halted and the voltage of the time component is measured and recorded for a selected period of time. The selected period of time may correspond to expected power outages. Typically, the voltage measurements are stored with a time value or stamp. The measurements are used to develop the calibration information. In one example, the calibration information is a lookup table having the voltage measurements and the associated time values. In another example, the calibration information is a formula, such as the formula shown in the described for FIG. 3. Once complete, the system transitions back to the ON mode.

A transition from the ON mode 402 to the OFF mode 406 occurs on a power removal triggering event, which includes removal of the main power. In one example, the main power is a battery and the trigger event is removal of the battery. In the OFF mode 406, the main power is not supplied to the RTC and power drains from the time component through the RTC.

A transition from the OFF mode 406 to the restart mode 408 occurs on a power return triggering event. This includes a return of the main power and the main supply. In one example, the main power is a battery and the trigger event is insertion or reinsertion of the battery. In the restart mode 408, the time component voltage is measured and used along with the calibration information to determine an elapsed time that the system was in the OFF mode 406. The elapsed time is used to configure the RTC to start tracking time with a current time or updated time. Once complete, the system transitions to the ON mode 402.

Figure 5:
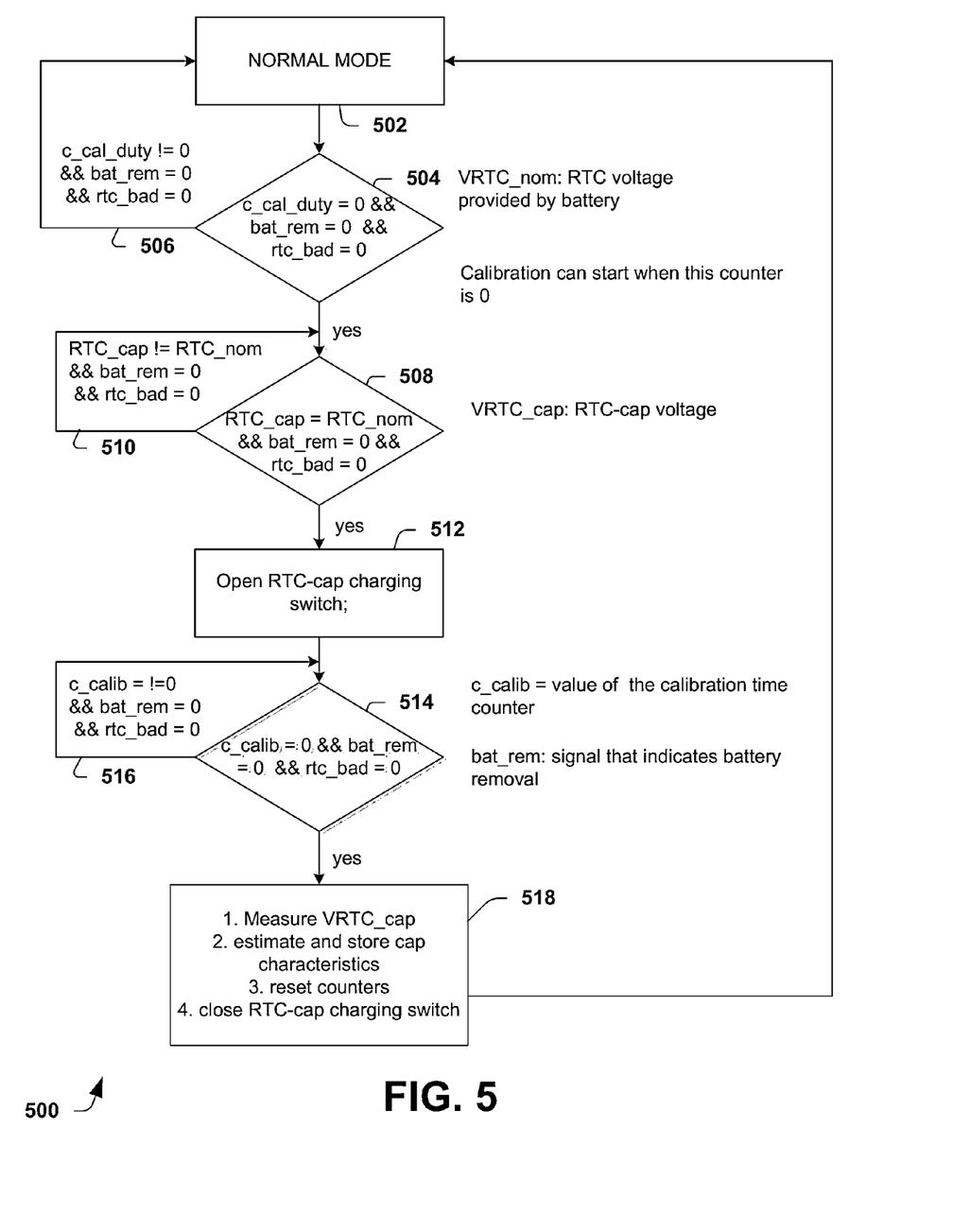
FIG. 5 is a flow diagram illustrating a method of calibrating a system utilizing a time component in the calibration mode.

FIG. 5 is a flow diagram illustrating a method 500 of calibrating a system utilizing a time component in the calibration mode 404. The method 500 and variations thereof can be utilized in the above described systems.

The method 500 begins at block 502, where a system utilizing a time component is in a normal mode. Power is supplied to the RTC by a main supply, such as battery power. This power is designated as VRTC_nom.

The system enters a calibration mode at block 504. A variety of suitable triggers can cause transitioning to the calibration mode. In this example, a calibration countdown counter, c_cal_duty, reaching zero causes the transition to the calibration mode. If the calibration countdown counter is not zero as determined at 506, the method 500 returns to the normal mode 502.

The time component is checked or verified to determine if it is at a nominal or initial value at block 508. In this example, the time component is designated as RTC_cap and the initial value is designated as RTC_nom. If the time component is not at the initial value, the method 500 proceeds along 510 to block 508 where the time component is charged further. Calibration is performed only when the time component is fully charged.

If the time component is fully charged, charge power is removed from the time component at block 512. A switch component, such as described above, can be used. The RTC is also disconnected from the main supply and power can start draining from the time component substantially through the RTC. It is noted that other circuitry and/or components are disconnected from the time component.

At block 514, one or more calibration compliance parameters are checked. These include a calibration counter (c_calib), the main supply (bat_rem), and the RTC (rtc_bad). If these parameters are not at or within acceptable ranges/values, then the calibration process should be halted. The calibration counter is checked to see if calibration is finished (at zero) and the main supply is checked for power. The calibration counter determines how long the calibration can be. If the calibration counter is not finished at 516, the method restarts at block 514 again.

If the main supply disappears during the calibration process, the measurements and the like may not be stored properly. For example, a battery could be removed. In such a case, the calibration process should not continue until the main supply returns, such as a battery being reinserted.

Calibration measurements are obtained at block 518. The measurements include voltage measurements, referred to as VRTC_cap, of the time component at various times for a selected duration. The measurements are stored in a memory device or other storage device. The selected duration is a period of time in which measurements are taken. In one example, the selected duration is 300 seconds. The time stamped measurements are used to generate a lookup table or other similar mechanism that can be later used to estimate elapsed time.

After obtaining the calibration measurements at block 518, the method 500 returns the system to the normal or ON mode.

Figure 6:
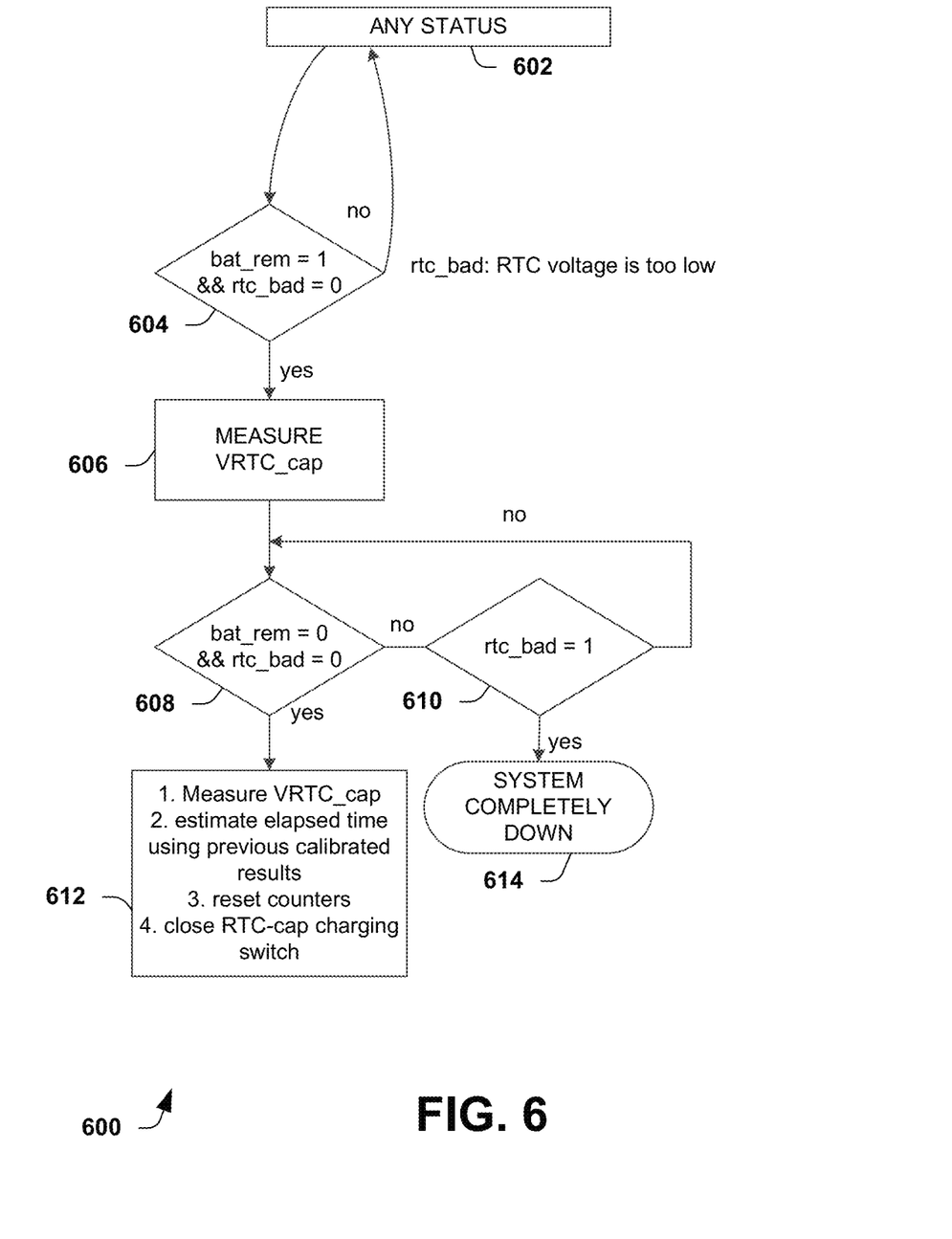
FIG. 6 is a flow diagram illustrating a method of determining an estimated elapsed time using a time component in the restart mode.

FIG. 6 is a flow diagram illustrating a method 600 of determining an estimated elapsed time using a time component in the restart mode. The method 600 typically uses calibration information/results from a calibration process to facilitate estimating elapsed time. The method 600 is used in a restart mode for a system in order to update an RTC to a current time by estimating an elapsed time and providing the elapsed time to the RTC. The method 600 is described in conjunction with the systems and methods described above.

The system is initially in any status or mode at block 602. In one example, the system is in an ON mode at block 602 where a real time clock is operating and tracking system time.

The method 600 transitions to block 604 by a power removal trigger event. In this example, the trigger event is removal of a battery supplying a main supply, designated as bat_rem=1. In another example, the trigger event is removal of a non-battery power source. At block 604, the voltage of the time component is checked for compliance against a threshold value. If the voltage is below the threshold value, designated as rtc_bad=1, the method 600 transitions back to the block 602. Otherwise, if the voltage is suitable, designated as rtc_bad=0, the method 600 transitions to block 606.

At block 606, the voltage of the time component is measured again. This measurement is designated as VRTC_cap. The system transitions to block 608 on a power return trigger event, such as insertion or replacement of a battery. The return trigger event is verified and the time component voltage is checked again to determine whether it is above the threshold value. If it is, the method 600 moves to block 612. Otherwise, the method 600 goes to block 610. From block 610, if the time component voltage is again below the threshold value, the system is completely shut down at block 614. This implies that power levels are too low to reliably start up and resume operation.

An estimated elapsed time is determined at block 612. The time component voltage is again measured (VRTC_cap). The time component voltage is used to determine/estimate the elapsed time using previous measured information from a calibration process, such as the method 500 described above. Any related counters are reset and a switch component is configured to supply charge power to the time component.

The methods 500 and 600 are described with details to facilitate understanding. However, it is appreciated that suitable variations are permitted.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

A system utilizing time tracking is disclosed. The system includes a real time clock, a time component, and a controller. The real time clock is configured to track time. The time component is configured to measure a time value without an additional power source. The controller is configured to determine an elapsed time using the time value and calibration information and to update the real time clock using the elapsed time in a restart mode.

Another system utilizing time tracking includes a removable battery power source, a real time clock and a time component. The removable power source is configured to generate a main supply. The real time clock is configured to utilize the main supply to track time. The time component is configured to track elapsed time on removal of the battery power source. The time component is self powered.

A method of operating a system having time tracking is disclosed. Time is tracked with a real time clock in an ON mode. Calibration information is developed in a calibration mode. A time value is tracked in an OFF mode using a time component. An elapsed time of the OFF mode is developed using the calibration information and the time value.

In one variation, the presence of a main supply is verified. Charging of the time component is halted. Current is discharged from the time component through the real time clock. The voltages of the time component are measured during the discharge. The voltage measurements of the time component over time are stored. The calibration information is developed from the stored voltage measurements.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well. Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A system utilizing time tracking, the system comprising:
   a real time clock configured to track time in an ON mode and deactivate in an OFF mode;
   a time component configured to track a time value during the OFF mode; and
   a controller configured to determine the elapsed time using the tracked time value and to update the real time clock using the elapsed time in a restart mode prior to the real time clock transitioning to the ON mode.

2. The system of claim 1, wherein the controller is configured to additionally use calibration information of the real time clock to determine the elapsed time.

3. The system of claim 1, further comprising an oscillator coupled to the real time clock.

4. The system of claim 1, further comprising a switch component configured to selectively remove a main supply from the real time clock during the OFF mode.

5. The system of claim 1, further comprising a switch component configured to provide a charge power to the time component from a main supply during the ON mode.

6. The system of claim 1, wherein the controller is configured to generate the calibration information using the time component and the real time clock in a calibration mode.

7. The system of claim 1, wherein the real time clock drains current from the time component in the OFF mode.

8. The system of claim 1, further comprising a discharge component configured to drain current from the time component in the OFF mode.

9. The system of claim 1, wherein the real time clock uses an oscillator clock signal to track time in an ON mode.

10. The system of claim 1, wherein the time component is a capacitor and wherein the time component tracks the time value by a voltage across the capacitor that lowers from an initial value to a restart value during the OFF mode, wherein the controller utilizes the restart value to determine the elapsed time.

11. The system of claim 1, further comprising a main supply configured to provide sufficient power to the real time clock in the ON mode, wherein a counter of the real time clock is activated and the main supply provides insufficient power to the real time clock in the OFF mode, wherein the counter of the real time clock is deactivated.

12. A system utilizing time tracking, the system comprising:
a removable battery power source configured to generate a main supply;
a real time clock configured to utilize the main supply to track time, wherein the real time clock uses an elapsed time to generate a current time in a restart mode; and
a time component configured to track the elapsed time on removal of the battery power source from the real time clock in an OFF mode, wherein the time component is self powered.

13. The system of claim 12, wherein the time component is configured to develop calibration information using the real time clock component to drain power through.

14. The system of claim 12, wherein the time component is a capacitor.

15. The system of claim 12, wherein the real time clock transitions from the OFF mode to the restart mode on insertion of the battery power source.

16. The system of claim 12, further comprising a discharge component configured to drain the time component in the OFF mode, wherein the real time clock and the time component transition to the OFF mode on removal of the battery power source.

17. A method of operating a system having time tracking, the method comprising:
tracking time with a real time clock in an ON mode;
developing calibration information in a calibration mode;
using a time component to track a time value in an OFF mode; and
developing an elapsed time of the OFF mode using the calibration information and the time value.

18. The method of claim 17, wherein developing calibration information comprises:
verifying presence of a main supply;
halting charging of the time component;
discharging current from the time component through a real time clock and measuring voltage of the time component;
storing the voltage measurements of the time component over time; and
developing the calibration information from the stored voltage measurements.

19. The method of claim 17, wherein developing the calibration information comprises using a dedicated resistor having a known resistance.

20. The method of claim 17, wherein using the time component to track a time value includes draining power from the time component at a selected rate.

* * * * *